US012733567B2

(12) United States Patent
Gent

(10) Patent No.: US 12,733,567 B2
(45) Date of Patent: Sep. 15, 2026

(54) SOIL OPENER

(71) Applicant: C.S. Gent & Sons LTD, Spalding (GB)

(72) Inventor: Anthony Gent, Spalding (GB)

(73) Assignee: C.S. Gent & Sons LTD, Spalding (GB)

( * ) Notice: Subject to any disclaimer, the term of this patent is extended or adjusted under 35 U.S.C. 154(b) by 317 days.

(21) Appl. No.: 18/572,032

(22) PCT Filed: Jun. 14, 2022

(86) PCT No.: PCT/EP2022/066207
§ 371 (c)(1),
(2) Date: Dec. 19, 2023

(87) PCT Pub. No.: WO2022/268579
PCT Pub. Date: Dec. 29, 2022

(65) Prior Publication Data

US 2024/0324489 A1 Oct. 3, 2024

(30) Foreign Application Priority Data

Jun. 23, 2021 (GB) ..................................... 2109016

(51) Int. Cl.
*A01C 5/06* (2006.01)

(52) U.S. Cl.
CPC .................................. *A01C 5/064* (2013.01)

(58) Field of Classification Search
CPC ...................... A01C 5/00–08; A01C 7/00–208
See application file for complete search history.

(56) References Cited

U.S. PATENT DOCUMENTS 1,416,331 A * 5/1922 Campbell .............. A01C 5/062 111/140
3,213,812 A * 10/1965 Forsyth et al. ........ A01C 5/064 111/80

(Continued)

FOREIGN PATENT DOCUMENTS

CA 2125533 A1 6/1994

OTHER PUBLICATIONS

International Search Report for Application No. PCT/EP2022/066207 dated Sep. 21, 2022, 4 pages.

(Continued)

*Primary Examiner* — Tara Mayo
(74) *Attorney, Agent, or Firm* — TraskBritt

(57) ABSTRACT

A soil opener includes a support and a soil opener unit. The soil opener unit comprises: first and second soil-cutting members; and a delivery tube with an exit aperture for releasing material to be deposited in the soil. The first soil-cutting member comprises a rotating disc having a first soil-engaging surface inclined: at a first angle to a perpendicular to the soil surface; and at a second angle to the direction of travel, whereby the rotating disc defines a leading upwardly inclined face defining a leading side of the rotating disc and a trailing downwardly-inclined face defining a trailing side of the rotating disc. The second soil-cutting member comprises a fixed blade defining a second soil-engaging surface. The second soil-engaging surface comprises a soil-lifting surface projecting laterally relative to the first soil-cutting member, and the exit aperture of the delivery tube is provided adjacent a rear part of the soil-lifting surface.

16 Claims, 15 Drawing Sheets

(56) References Cited

U.S. PATENT DOCUMENTS

| | | | | |
|---|---|---|---|---|
| 5,609,114 | A | 3/1997 | Barton | |
| 6,067,918 | A | 5/2000 | Kirby | |
| 9,655,297 | B2 * | 5/2017 | Barton | A01C 7/06 |
| 2005/0229826 | A1 * | 10/2005 | Summach et al. | A01B 15/02<br>111/14 |
| 2008/0229986 | A1 | 9/2008 | Arksey | |
| 2008/0257237 | A1 | 10/2008 | Friesen et al. | |
| 2009/0071383 | A1 * | 3/2009 | Cey | A01C 5/064<br>111/167 |
| 2013/0220653 | A1 | 8/2013 | Breker et al. | |
| 2014/0109809 | A1 | 4/2014 | Schilling et al. | |
| 2019/0239420 | A1 * | 8/2019 | Pfitzner | A01B 15/16 |
| 2020/0315080 | A1 * | 10/2020 | McLuckie et al. | A01B 49/06 |

OTHER PUBLICATIONS

International Written Opinion for Application No. PCT/EP2022/066207 dated Sep. 21, 2022, 9 pages.

* cited by examiner

12'
20'
22'
24B'
23'
40'
34'
26'
24A'
102'
32'
100''
"D"
210
100'
30''
10'
30'

SOIL OPENER

CROSS-REFERENCE TO RELATED APPLICATIONS

This application is a national phase entry under 35 U.S.C. § 371 of International Patent Application PCT/EP2022/066207, filed Jun. 14, 2022, designating the United States of America and published as International Patent Publication WO 2022/268579 A1 on Dec. 29, 222, which claims the benefit under Article 8 of the Patent Cooperation Treaty of Great Britain Patent Application Serial No. 2109016.2, filed Jun. 23, 2021.

TECHNICAL FIELD

The present disclosure relates to apparatus for parting soil for placing seed and/or other agricultural products (e.g., fertilizer) in the ground, also known as a "soil opener."

BACKGROUND

U.S. Pat. No. 5,609,114 (Barton) discloses a soil opening tool assembly for use with an agricultural implement intended to be moved in a specified line of travel and comprising a first generally upright rotating disc configured to penetrate into the soil to a first depth below the soil surface. The disc is set at a first horizontal angle to the line of travel to provide a leading surface and a trailing surface relative to the direction of travel, the leading surface corresponding to a soil displacement side and the trailing surface corresponding to a furrow creation side. The disc is also set at a first angle to the vertical whereby a top of the disk is inclined generally toward the trailing surface. In one particular embodiment, a disc is toed in 8° horizontally from the line of travel and leans inwards 23° to the vertical. According to U.S. Pat. No. 5,609,114, the combined effect of these two angles is that the soil is undercut, lifted and moved by a small amount horizontally (toward the soil displacement side), creating an angled furrow on the furrow creation side into which seed and/or fertilizer is dispensed. The displaced soil exerts a sideways reaction force on the disc, which is transmitted via a rigid connection to the frame of the agricultural implement. An additional disc is also disclosed that engages the soil at a point behind the first disc in the direction of travel to cut a second furrow.

U.S. Pat. No. 6,067,918 (Kirby) shows a similar arrangement comprising a first generally upright rotating disc configured to penetrate into the soil to a first depth below the soil surface to create a furrow. A so-called "finger wheel" is also provided to move portions of soil displaced by the disc back over the furrow. To this end, the finger wheel does not penetrate the soil in the manner of the first disc but is instead pivotally attached to a frame and is free to move up and down as it rides on the ground.

BRIEF SUMMARY

The need for an improved soil opener that overcomes or at least alleviates problems associated with the prior art has been identified.

In accordance with a first aspect of the present disclosure, there is provided a soil opener for driving through soil in a direction of travel (D), the soil opener comprising: a support; and a soil opener unit mounted on the support, wherein the soil opener unit comprises: first and second soil-cutting members; and a delivery tube with an exit aperture for releasing material to be deposited in the soil (e.g., seed and/or agricultural products such as fertilizer); wherein: the first soil-cutting member comprises a rotating disc having a first soil-engaging surface inclined: at a first angle (H) to a perpendicular (V) to the soil surface (G) when viewed along the direction of travel (D), the first angle (H) being greater than zero; and at a second angle (J) to the direction of travel (D) when viewed along a perpendicular (V) to the soil surface (G), the second angle (J) being greater than zero, whereby the rotating disc defines a leading upwardly-inclined face defining a leading side of the rotating disc (e.g., associated with a soil displacement side) and a trailing downwardly-inclined face defining a trailing side of the rotating disc (e.g., associated with a furrow side) relative to the direction of travel (D); and the second soil-cutting member comprises a fixed blade defining a second soil-engaging surface; wherein: the second soil-engaging surface comprises a soil lifting surface projecting laterally relative to the first soil-cutting member; and the exit aperture of the delivery tube is provided adjacent a rear part of the soil lifting surface.

In one embodiment, the first soil-cutting member is a leading soil-cutting member and the second soil-cutting member is a trailing soil-cutting member.

In this way, a soil opener is provided in which a leading rotating cutter set at a compound angle operates to cut and loosen soil and a trailing fixed blade operates to lift an upper section of soil to allow material to be deposited beneath the lifted section of soil. Advantageously, this two-stage procedure gains the benefits of rotary and fixed cutters with minimum soil disruption.

In one embodiment, the fixed blade is positioned rearwardly of an axis of rotation of the rotating disc relative to the direction of travel (D).

In one embodiment, the exit aperture is angled to direct delivered material beneath the fixed blade.

In one embodiment, the fixed blade is located on the leading side of the rotating disc. In this way, the fixed blade is positioned to lift soil on the soil displacement side of the rotating disc (i.e., lift a section of soil including soil that has been laterally displaced by the rotating disc).

In one embodiment, the delivery tube is laterally offset relative to the fixed blade.

In one embodiment, the delivery tube is located substantially behind an outer envelope of the rotating disc. In one embodiment, the delivery tube being oriented substantially parallel to the first soil-engaging surface.

In one embodiment, the fixed blade is positioned in advance of the exit aperture (e.g., in advance of the delivery tube) relative to the direction of travel (D).

In one embodiment, the delivery tube comprises an upper body section for connection to a delivery hose and a lower body section defining the exit aperture.

In one embodiment, the lower body section of the delivery tube has a lateral width (e.g., when viewed along the direction of travel (D)) that is substantially equal to or less than the visible width of the rotating disc when viewed along the direction of travel (D).

In one embodiment, the lower body section of the delivery tube (e.g., including the exit aperture) is substantially concealed from view by the rotating disc when viewed along the direction of travel (D) from the front.

In one embodiment, the lower body section of the delivery tube has a lateral width when viewed along the direction of travel (D) that is smaller than the length of the lower body section in the direction of travel (D).

In one embodiment, the lower body section of the delivery tube is substantially rectangular in cross section (e.g., with the shortest sides facing the direction of travel (D)).

In one embodiment, each of the upper and lower body sections of the delivery tube are substantially concealed from view by the rotating disc when viewed along the direction of travel (D) from the front.

In one embodiment, the soil lifting surface sits outside the circumference of the first soil-engaging member when viewed transversely to the direction of travel (D) and parallel to the soil surface (G).

In one embodiment, the exit aperture of the delivery tube sits outside the circumference of the first soil-engaging member when viewed transversely to the direction of travel (D) and parallel to the soil surface (G).

In one embodiment, the lower body section of the delivery tube sits outside the circumference of the first soil-engaging member when viewed transversely to the direction of travel (D) and parallel to the soil surface (G).

In one embodiment, the first angle (H) is greater than the second angle (J).

In one embodiment, the first angle (H) lies in the range of about 5 to about 30 degrees.

In one embodiment, the first angle (H) is about 20 degrees.

In one embodiment, the second angle (J) lies in the range of about 2-15 degrees.

In one embodiment, the second angle (J) is about 5 degrees.

In one embodiment, the first and second soil-cutting members are configured to penetrate the soil to substantially the same depth below the soil surface (G).

In one embodiment, the first soil-engaging surface is configured to penetrate into the soil to a first depth (e.g., first maximum depth) below the soil surface (G).

In one embodiment, the soil lifting surface is configured to penetrate into the soil to a second depth (e.g., second maximum depth) below the soil surface (G).

In one embodiment, the second depth is less than the first depth.

In one embodiment, the soil lifting surface extends at a third angle (K) relative to the soil surface (G).

In one embodiment, the third angle (K) lies in the range of about 0-45 degrees (e.g., 0-30 degrees).

In one embodiment, the third angle (K) is about 10 degrees.

In one embodiment, the fixed blade defines leading and trailing fixed blade edges.

In one embodiment, the leading fixed blade edge projects substantially parallel to the soil surface (G).

In one embodiment, the trailing fixed blade edge projects substantially parallel to the soil surface (G).

In one embodiment, the soil lifting surface comprises a substantially planar blade surface extending between the leading and trailing fixed blade edges.

In one embodiment, the fixed blade is a substantially planar fixed blade.

In one embodiment, the leading fixed blade edge of the fixed blade is swept back relative to the direction of travel (D) by a fourth angle (L).

In one embodiment, the fourth angle (L) is in the range of about 0-30 degrees.

In one embodiment, the fourth angle (L) is about 10 degrees.

In one embodiment, the trailing fixed blade edge of the fixed blade is swept back relative to the direction of travel (D) by a fifth angle "M."

In one embodiment, the fifth angle (M) is in the range of about 0-30 degrees.

In one embodiment, the fifth angle (M) is about 10 degrees.

In one embodiment, the fifth angle (M) equals the value of the fourth angle (L).

In one embodiment, the rotary disc is positioned in advance of the exit aperture relative to the direction of travel (D).

In one embodiment, the trailing exit aperture is positioned adjacent the rear fixed blade edge.

In one embodiment, the fixed blade projects laterally from the exit aperture when viewed along the direction of travel (D).

In one embodiment, the leading fixed blade edge is positioned rearwardly of the axis of rotation of the rotating disc relative to the direction of travel (D).

In one embodiment, the rotating disc is mounted to a rotating disc connecting bracket.

In one embodiment, the fixed blade is mounted to a fixed blade connecting bracket.

In one embodiment, the fixed blade connecting bracket is mounted to the rotating disc connecting bracket. In another embodiment, the fixed blade connecting bracket may be integrally formed with the rotating disc connecting bracket.

In one embodiment, the delivery tube is mounted to the fixed blade connecting bracket.

In one embodiment, the rotating disc connecting bracket supports a rotating disc bearing.

In one embodiment, the rotating disc connecting bracket comprises an upper part (e.g., substantially vertical upper part) and a lower part supporting the rotating disc.

In one embodiment, the lower part defines a first planar support surface.

In one embodiment, the first planar support surface extends substantially parallel to the rotating disc (e.g., extending at substantially the first angle (H) to a perpendicular (V) to the soil surface (G) when viewed along the direction of travel (D) and at a second angle (J) to the direction of travel (D) when viewed along a perpendicular (V) to the soil surface (G)).

In one embodiment, the rotating disc bearing is provided on the lower part.

In one embodiment, the fixed blade connecting bracket extends rearwardly of the rotating disc connecting bracket relative to the direction of travel (D).

In one embodiment, the fixed blade connecting bracket defines a second planar support surface.

In one embodiment, the second planar support surface extends substantially parallel to the first planar support surface.

In one embodiment, the fixed blade connecting bracket includes a tapered lower section (e.g., reducing in longitudinal width with proximity to the fixed blade).

In one embodiment, the delivery tube is mounted to a rear section (e.g., rear edge) of the fixed blade connecting bracket.

In one embodiment, the exit aperture is positioned immediately behind the rear edge of the fixed blade when viewed transversely to the direction of travel (D) and parallel to the soil surface (G).

In one embodiment, the apparatus further comprises a trailing arm assembly mounted to the support and operative to allow the soil opener unit to follow ground contour variations.

In one embodiment, the trailing arm assembly is operative to maintain a predetermined orientation of the soil opener unit relative to the ground. For example, the trailing arm assembly may comprise a parallel linkage assembly.

In one embodiment, the apparatus is biased to maintain a downward force on soil opener unit (e.g., to maintain suitable ground pressure). The biasing action may be provided by one or more of a spring bias device, a hydraulic bias device, and a pressurized air bias device.

In accordance with a second aspect of the present disclosure, there is provided a soil opener for driving through soil in a direction of travel (D), the soil opener comprising: a support; and first and second soil opener units mounted on the support on opposed sides of a central axis; wherein the first the soil opener unit comprises: first and second soil-cutting members; and a first delivery tube with a first exit aperture for releasing material to be deposited in the soil; wherein: the first soil-cutting member comprises a first rotating disc having a first soil-engaging surface inclined in a first direction: at a first angle (H) to a perpendicular (V) to the soil surface (G) when viewed along the direction of travel (D), the first angle (H) being greater than zero; and at a second angle (J) to the direction of travel (D) when viewed along a perpendicular (V) to the soil surface (G), the second angle (J) being greater than zero, whereby the first rotating disc defines a first leading upwardly-inclined face defining a leading side of the first rotating disc (e.g., associated with a soil displacement side of the first rotating disc) and a first trailing downwardly-inclined face defining a trailing side of the first rotating disc (e.g., associated with a furrow side of the first rotating disc) relative to the direction of travel (D); and the second soil-cutting member comprises a first fixed blade defining a second soil-engaging surface; wherein: the second soil-engaging surface comprises a first soil lifting surface projecting laterally relative to the first soil-cutting member; and the first exit aperture of the first delivery tube is provided adjacent a rear part of the first soil lifting surface; and wherein second the soil opener unit comprises: third and fourth soil-cutting members; and a second delivery tube with a second exit aperture for releasing material to be deposited in the soil; wherein: the third soil-cutting member comprises a second rotating disc having a third soil-engaging surface inclined in a second direction (e.g., opposed to the first direction): at a first angle (H') to a perpendicular (V) to the soil surface (G) when viewed along the direction of travel (D), the first angle (H') being greater than zero; and at a second angle (J') to the direction of travel (D) when viewed along a perpendicular (V) to the soil surface (G), the second angle (J') being greater than zero, whereby the second rotating disc defines a second leading upwardly-inclined face defining a leading side of the second rotating disc (e.g., associated with a soil displacement side of the second rotating disc) and a second trailing downwardly-inclined face defining a trailing side of the second rotating disc (e.g., associated with a furrow side of the second rotating disc) relative to the direction of travel (D); and the fourth soil-cutting member comprises a second fixed blade defining a fourth soil-engaging surface; wherein: the fourth soil-engaging surface comprises a second soil lifting surface projecting laterally relative to the third soil-cutting member; and the second exit aperture of the second delivery tube is provided adjacent a rear part of the second soil lifting surface.

In one embodiment, the first fixed blade of the first soil opener unit is located on the leading side of the first rotating disc (e.g., projecting toward the central axis) and the second fixed blade of the second soil opener unit is located on the leading side of the second rotating disc (e.g., also projects toward the central axis, whereby the first and second fixed blades project toward each other).

In one embodiment, the first and second fixed blades have laterally outermost edges that are laterally adjacent when viewed along the direction of travel (D).

In one embodiment, the first and second soil opener units are longitudinally aligned. In this way, the first and second fixed blades may be longitudinally aligned (e.g., in addition to being laterally adjacent when viewed along the direction of travel (D)).

In one embodiment, the first and second soil opener units are longitudinally offset (e.g., partially overlapping or substantially non-overlapping). In this way, the first and second fixed blades may be longitudinally non-overlapping (e.g., in addition to being laterally adjacent when viewed along the direction of travel (D)).

In one embodiment, the first soil opener is a soil opener in accordance with any embodiment of the first aspect of the present disclosure (e.g., with angles H, J, K, L and M where applicable).

In one embodiment, the second soil opener is a soil opener in accordance with any embodiment of the first aspect of the present disclosure (e.g., with angles H', J', K', L' and M' where applicable).

In one embodiment, the value of angle H' is equal to the value of angle H.

In one embodiment, the value of angle J' is equal to the value of angle J.

In one embodiment, the value of angle K' is equal to the value of angle K.

In one embodiment, the value of angle L' is equal to the value of angle L.

In one embodiment, the value of angle M' is equal to the value of angle M.

BRIEF DESCRIPTION OF THE DRAWINGS

Embodiments of the present disclosure will now be described by way of example with reference to the accompanying drawings in which.

DETAILED DESCRIPTION

Figure 1:
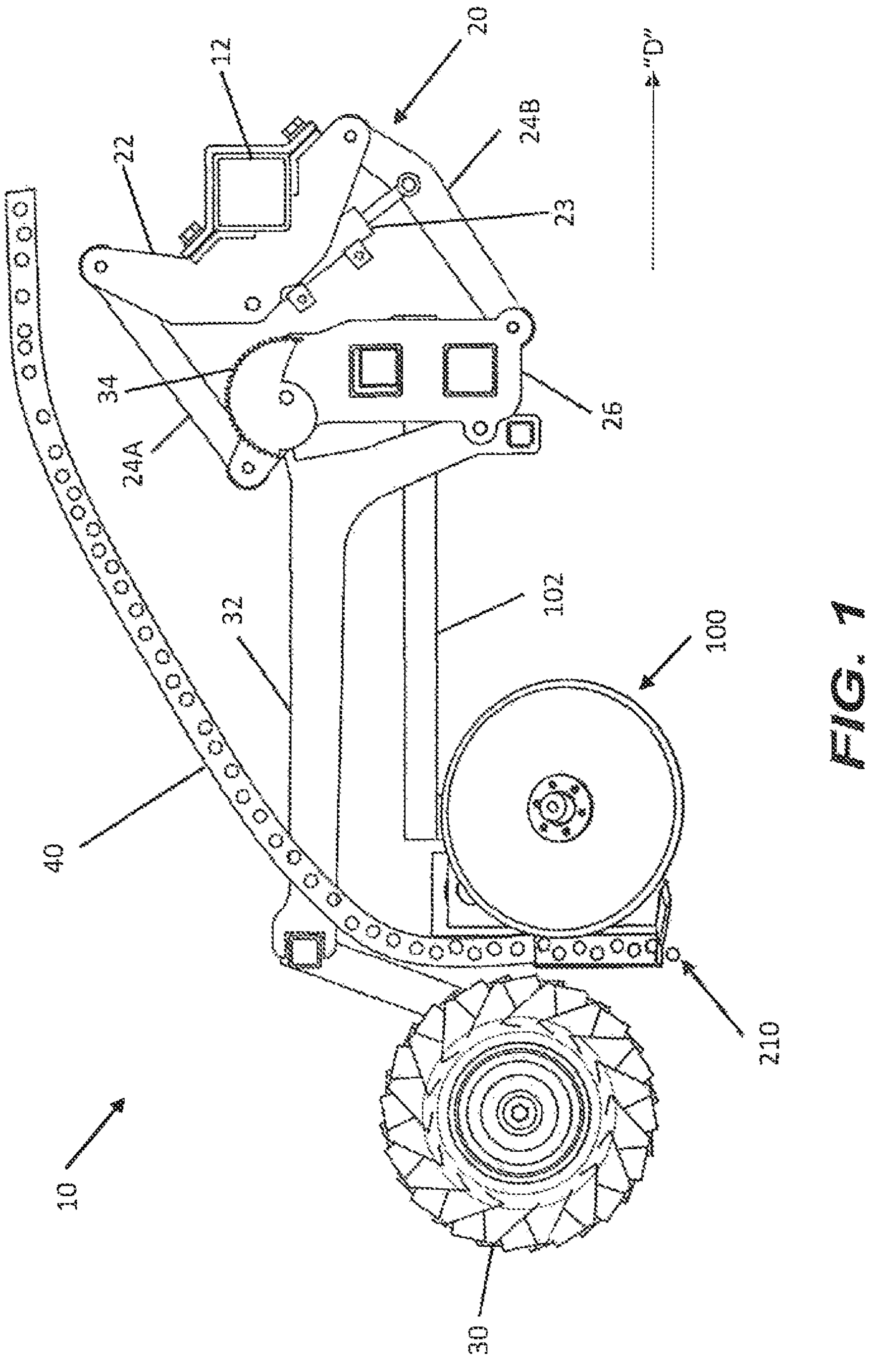
FIG. 1 is a schematic side view of a soil opener assembly in accordance with a first embodiment of the present disclosure.

FIG. 1 shows a soil opener assembly 10 configured to be driven, typically towed, through a field in a direction of travel "D" by a cross-beam support 12 of a seed drill via a parallel linkage arrangement 20 comprising a frame fixing body 22 with hydraulic suspension ram 23 comprising upper and lower trailing arms 24A, 24B each articulated at one end to the cross-beam support 12 and at the other end to a carrier 26 operative to support an individual row unit frame. The soil opener assembly 10 includes a rear wheel 30 (for depth control/consolidation) mounted on a wheel support frame arm 32, which is connected to the carrier 26 and adjustable via an adjustment mechanism 34 mounted on the carrier together with a delivery hose 40 operative to supply seed and/or other agricultural products (e.g., fertilizer) into the ground, the delivery hose 40 being connected to a soil opener unit 100 mounted on a soil opener unit support frame arm 102.

As illustrated in FIGS. 2A-2F, soil opener unit 100 comprises: a first (leading) soil-cutting member 110 mounted on an upper connecting bracket 120; a second (trailing) soil-cutting member 130 mounted on a lower connecting bracket 140 connected in turn to the upper connecting bracket; and a delivery tube 150 with an exit aperture 152 for releasing material to be deposited in the soil.

First soil-cutting member 110 comprises a rotating disc 112 rotatable around a rotary axis "R" and defining a first soil-engaging surface 112A inclined: at a first angle (H) to a perpendicular (V) to the soil surface (G) when viewed along the direction of travel, the first angle (H) being greater than zero; and at a second angle (J) to the direction of travel when viewed along a perpendicular (V) to the soil surface (G), the second angle (J) being greater than zero but less than the first angle (H), whereby the rotating disc 112 defines a leading upwardly inclined face 112A defining a leading side 114A of the rotating disc (e.g., associated with a soil displacement side) and a trailing downwardly inclined face 112B defining a trailing side 114B of the rotating disc (e.g., associated with a furrow side) relative to the direction of travel (D). Together, first angle (H) and second angle (J) form a compound angle for the rotating disc. Typically, the first angle (H) lies in the range of about 5 to about 30 degrees and the second angle (J) lies in the range of about 2-15 degrees. In this illustrated embodiment, the first angle (H) is 20 degrees and the second angle (J) is 5 degrees.

Second soil-cutting member 130 comprises a fixed blade 132 located rearwardly of the rotary axis "R" and defining a second soil-engaging surface 132A, which comprises a soil-lifting surface 134 projecting laterally relative to the first soil-cutting member 110 and the delivery tube 150, the fixed blade 132 being located on the leading side of the rotating disc 112. In this illustrated embodiment, the fixed blade projects approximately 40 mm from the lower connecting bracket 140.

Upper connecting bracket 120 comprises a substantially vertical upper part 122 and a lower part 124. Lower part 124 defines a first planar support surface 124A that extends substantially parallel to the rotating disc 112 and includes a rotating disc bearing 126 to which rotating disc 112 is rotatably coupled.

Lower connecting bracket 140 extends rearwardly of upper connecting bracket 120 and defines a second planar support surface 140A extending substantially parallel to the first planar support surface 124A.

Lower connecting bracket 140 includes a tapered lower section 142 that reduces in longitudinal width with proximity to the fixed blade 132.

Delivery tube 150 is mounted to a rear section of lower connecting bracket 140. Delivery tube 150 comprises a substantially rectangular body 151 comprising an upper body section 151A for connection to delivery hose 40 and a lower body section 151B defining the exit aperture 152. Rectangular body 151 has a width that is substantially equal to or less than the visible width of the rotating disc 112 when viewed along the direction of travel (D).

Optionally, the height of the lower connecting bracket 140 relative to the upper connecting bracket 120 may be alterable via a fixed blade adjustment mechanism.

Delivery tube 150 is mounted on the lower connecting bracket 140 and orientated such that the exit aperture 152 is provided adjacent and trailing a rear part of the soil-lifting surface 134 closest to the lower connecting bracket 140 and angled to direct delivered material beneath the fixed blade 132.

Figure 2A:
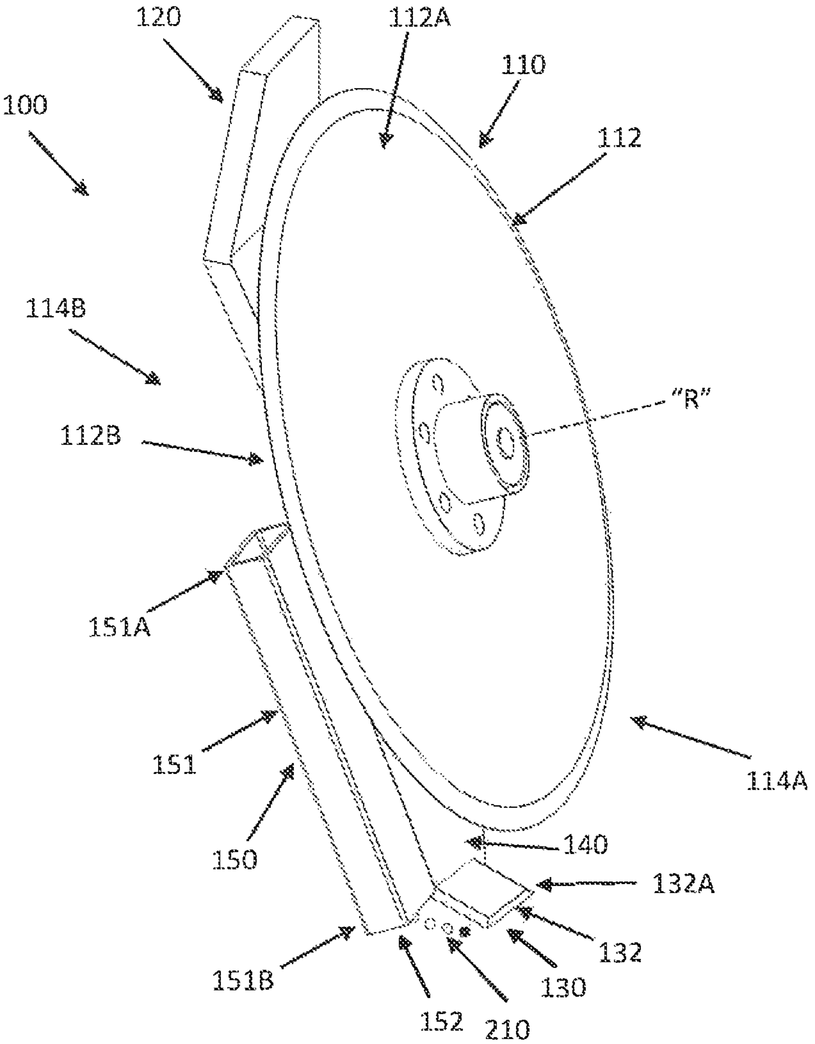
FIG. 2A is a schematic rear perspective view of a soil opener unit of the soil opener assembly of FIG. 1 viewed along the direction of travel.
Figure 2B:
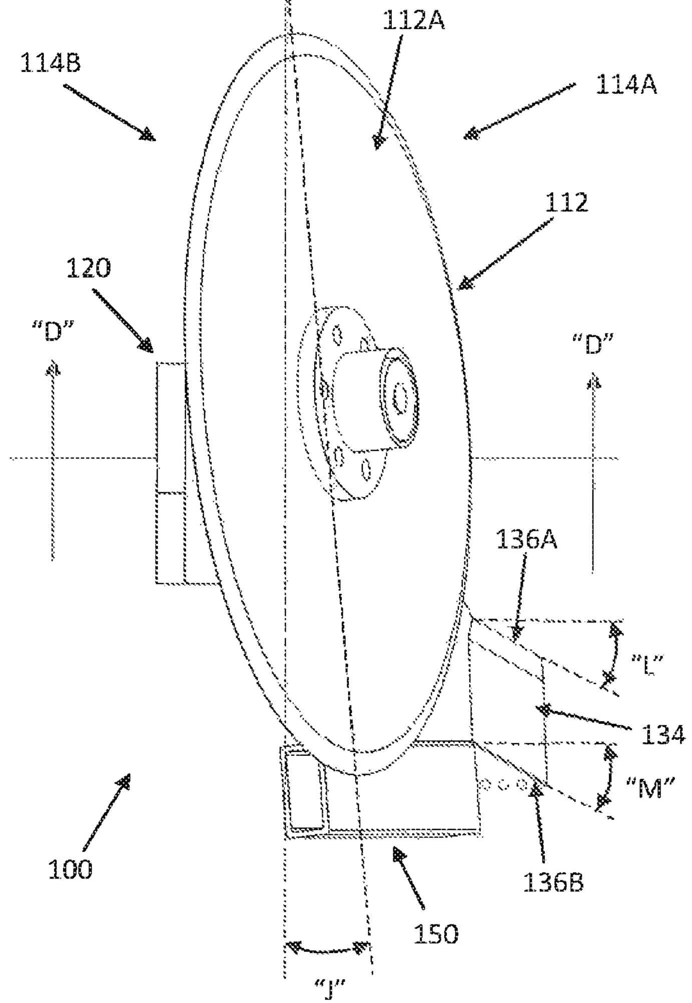
FIG. 2B is a schematic top perspective view of the soil opener unit of FIG. 2A.
Figure 2C:
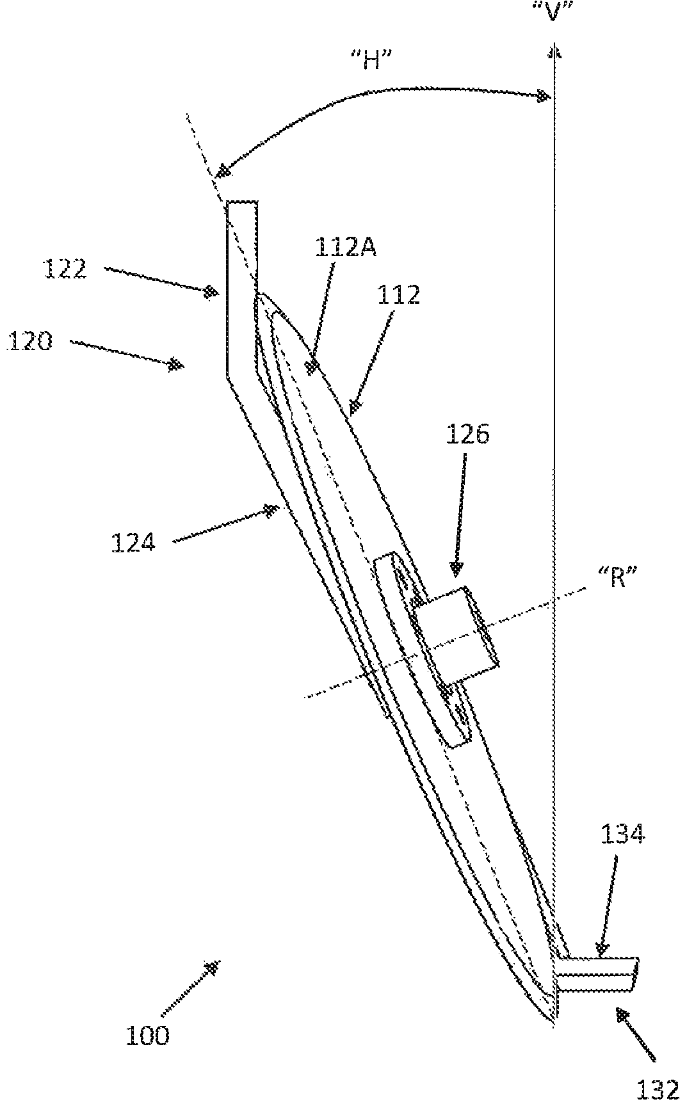
FIG. 2C is a schematic front view of the soil opener unit of FIG. 2A viewed along the direction of travel.
Figure 2D:
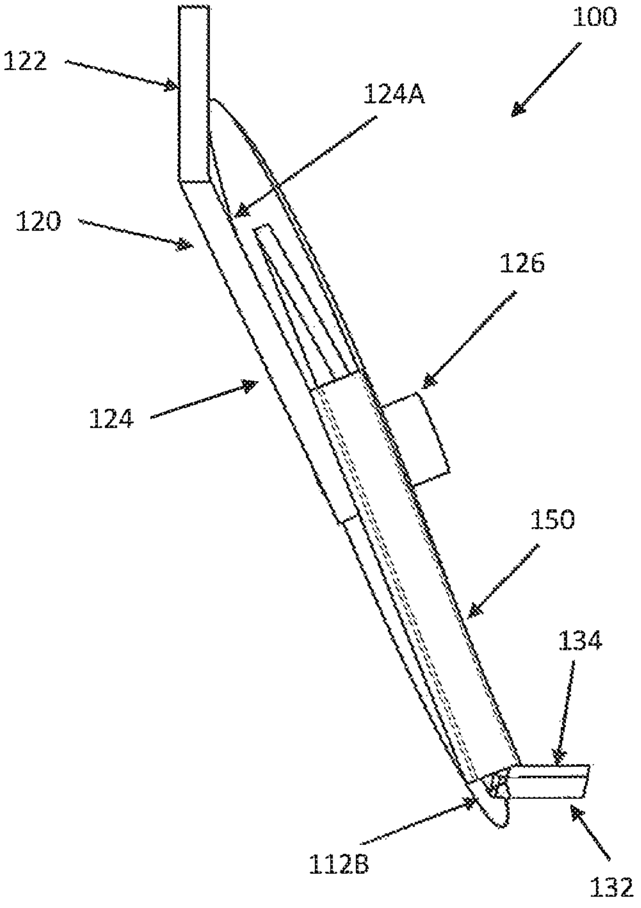
FIG. 2D is a schematic rear view of the soil opener unit of FIG. 2A viewed along the direction of travel.
Figure 2E:
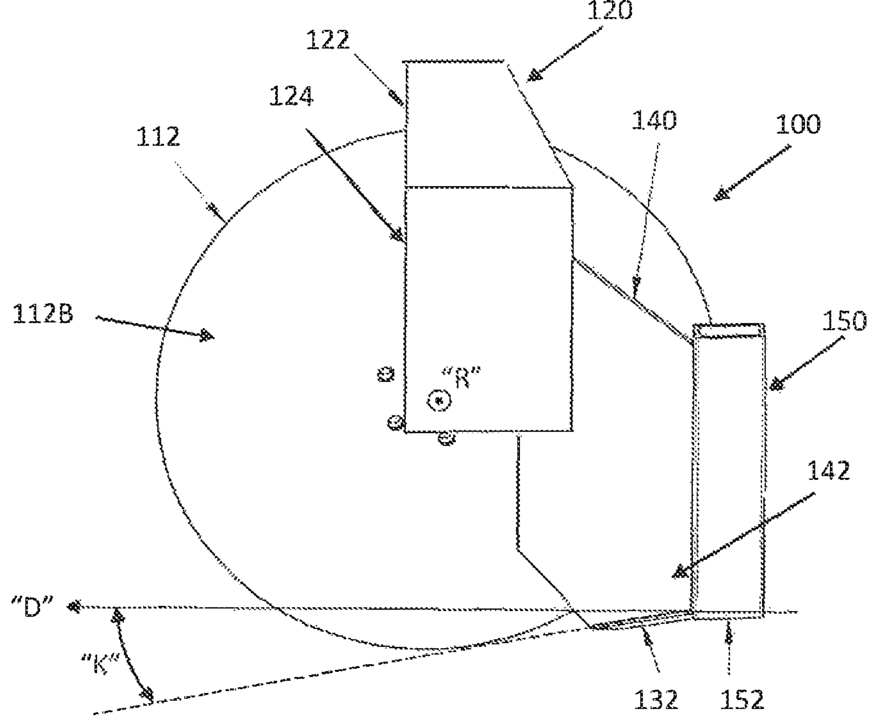
FIG. 2E is a first schematic side view of the soil opening unit of FIG. 2A.
Figure 2F:
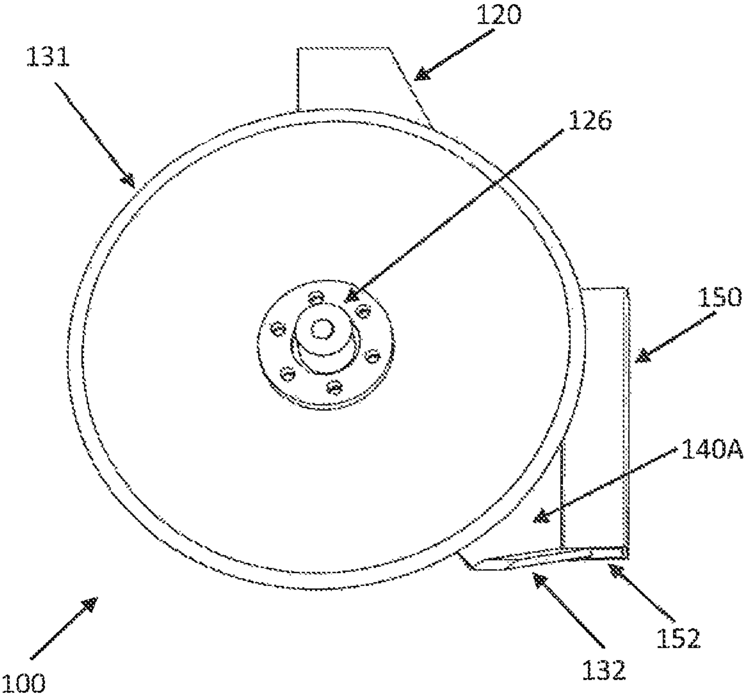
FIG. 2F is a second schematic side view of the soil opening unit of FIG. 2A.

As illustrated in FIG. 2E, the first soil-engaging surface 112A is configured to penetrate into the soil to a first depth below the soil surface and the soil-lifting surface 134 is configured to penetrate into the soil to a second depth below the soil surface that is less than the first depth.

Fixed blade 132 takes the form of a substantially planar fixed blade defining leading and trailing fixed blade edges 136A, 136B each projecting substantially parallel to the soil surface (G) and the soil-lifting surface 134 comprises a substantially planar blade surface extending a third angle (K) relative to the soil surface (G) between the leading and trailing fixed blade edges 136A, 136B. Typically, the third angle (K) lies in the range of about 0-45 degrees (e.g., 0-30 degrees). In this illustrated embodiment, the third angle (K) is 10 degrees. As shown, leading fixed blade edge 136A includes a beveled cutting edge 138.

Leading and trailing fixed blade edges 136A, 136B are swept back relative to the direction of travel (D) by fourth and fifth angles (L) and (M), respectively. Typically, the fourth angle (L) and fifth angle (M) are in the range of about 0-30 degrees and may be identical in value. In this illustrated embodiment, the fourth angle (L) and fifth angle (M) are each about 10 degrees.

As illustrated in FIG. 2C, delivery tube 150 is laterally offset relative to the fixed blade 132 and is located substantially behind outer envelope of the rotating disc 112 such that delivery tube 150 is substantially concealed from view by the rotating disc 112 when viewed along the direction of travel (D) from the front.

With reference to FIG. 2E, the fixed blade 132 and lower body section 151B of the delivery tube 150 each sit outside the circumference of the rotating disc 112 when viewed transversely to the direction of travel and parallel to the soil surface. Furthermore, fixed blade 132 is positioned in advance of the delivery tube 150 such that the exit aperture 152 is immediately behind the trailing fixed blade edge 136B of the fixed blade 132 when viewed transversely to the direction of travel (D) and parallel to the soil surface (G).

Figure 3A:
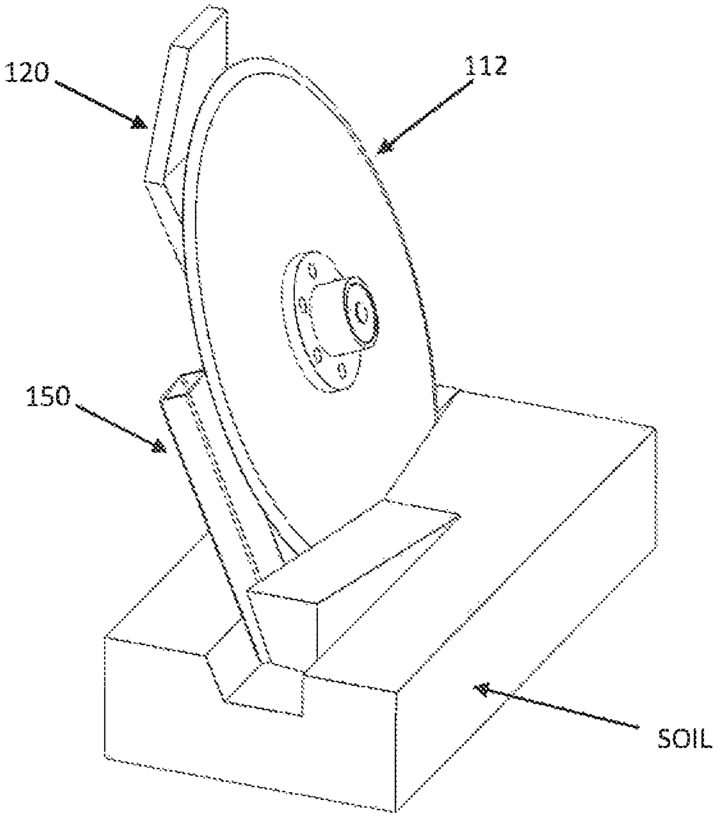
FIG. 3A is a schematic rear perspective view of the soil opener unit of FIG. 2A in use in the ground.
Figure 3B:
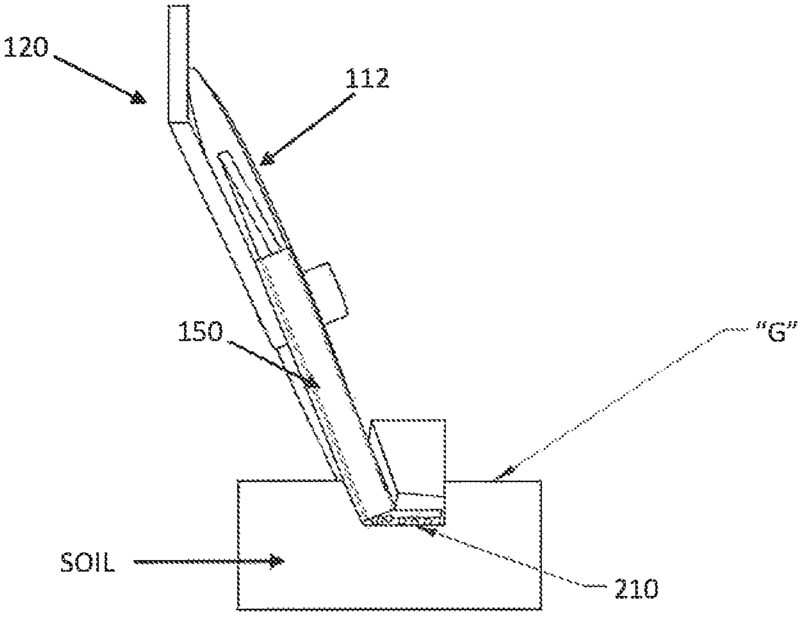
FIG. 3B is a schematic rear view of the soil opener unit of FIG. 2A in use in the ground.
Figure 3C:
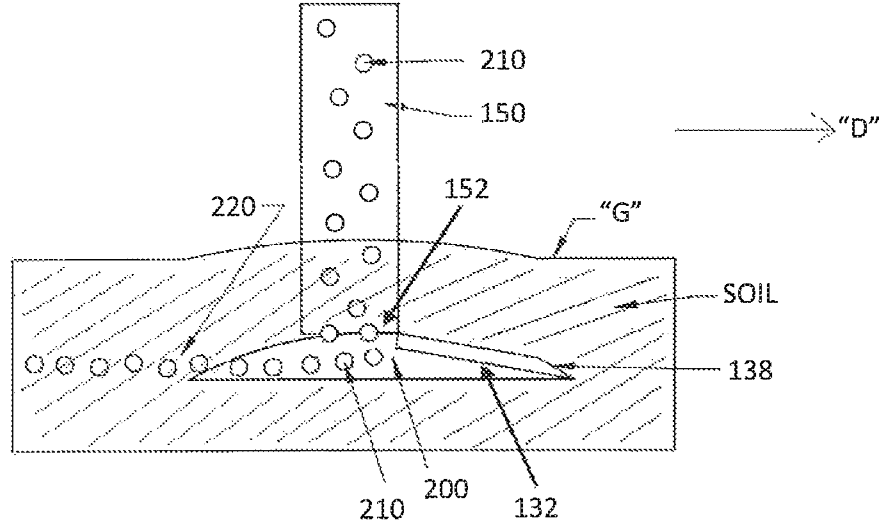
FIG. 3C is a schematic side view of the seeding tube and fixed blade parts of the soil opener unit of FIG. 2A in the ground.

With reference to FIGS. 3A-3C, the rotating disc 112 is positioned in the direction of travel (D) to induce an initial cut into the soil, which acts to slice through any surface residue and applies a downwards cutting action to the soil. The second angle (J) results in the angle of the leading cutting edge of the rotating disc being laterally offset relative to the rear edge, which, in combination with the first angle (H), creates a lateral soil displacement action allowing the lower connecting bracket 140 and delivery tube 150 to flow behind the rotating disc 112 without causing significant soil disruption. The trailing fixed blade 132 is angled by third angle (K) to induce an upward inclination to the soil flowing over the upper soil-lifting surface 134, creating a void 200 underneath. This resulting soil-flow lift in conjunction with the leading lateral soil-flow lift generated by the rotating disc 112 allows seed and/or other agricultural products 210 (e.g., fertilizer) to be introduced into the soil via delivery hose 40 connected to delivery tube 150, with the exit aperture 152 being angled to deposit the seed/agricultural products 210 across the entire lateral width of the combined void 200 created by the combination of the rotating blade and the fixed blade. Soil then returns to the surface position downstream of the exit aperture 152 at location 220 thereby closing void 200 and the returned soil is consolidated by rear wheel 30 in the normal manner.

In this way, a soil opener assembly is advantageously provided in which a leading rotating cutter set at a compound angle operates to cut and loosen soil and a trailing fixed blade operates to lift an upper section of soil (including loosened soil laterally displaced by the leading rotating cutter into the path of the fixed blade) to allow seed/agricultural products to be deposited beneath the lifted section of soil. Advantageously, this two stage procedure gains the benefits of rotary and fixed cutters with minimum soil disruption.

Figure 4:
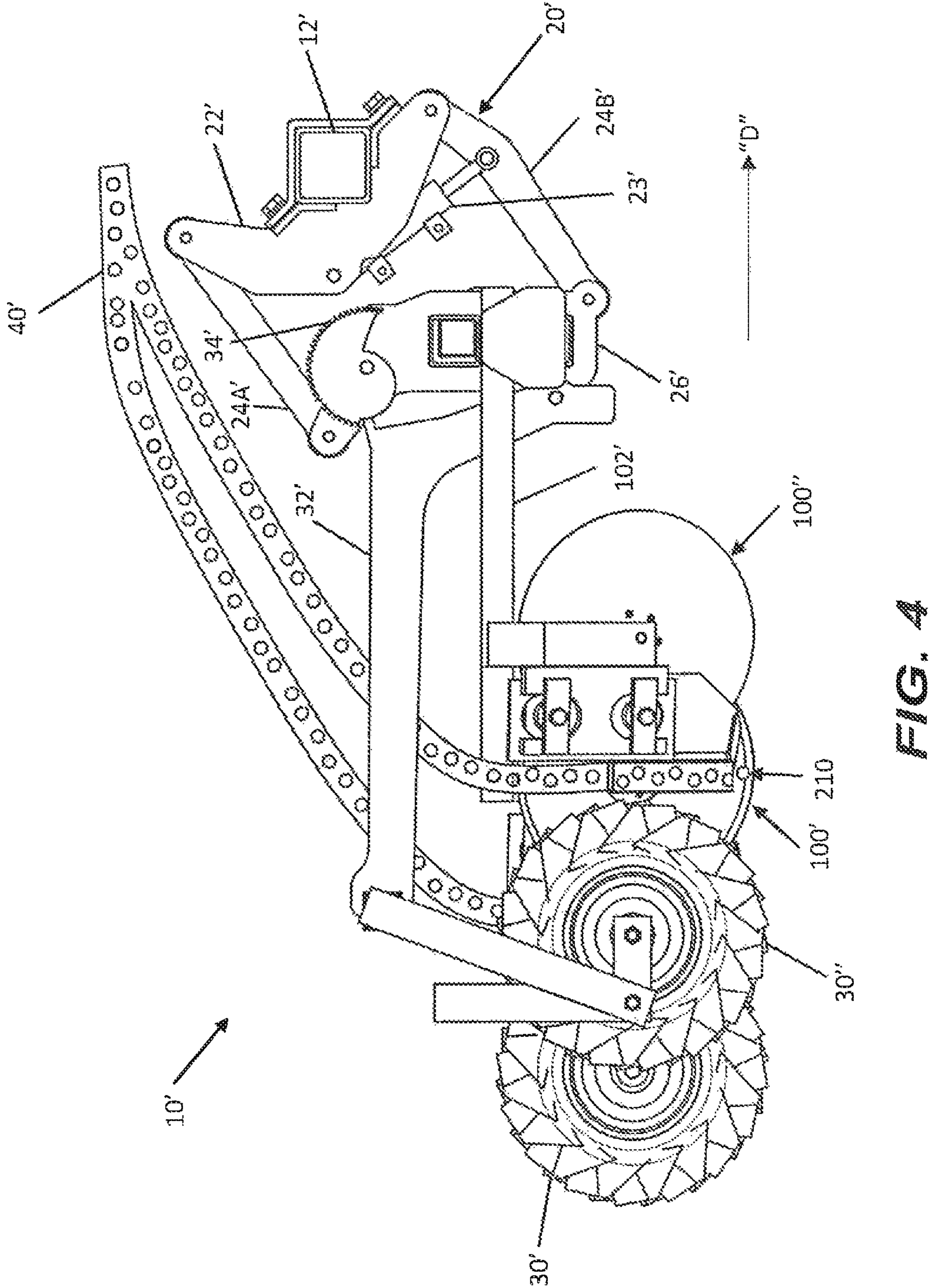
FIG. 4 is a schematic side view of a soil opener assembly in accordance with a second embodiment of the present disclosure comprising a pair of soil opening units.

FIG. 4 shows a soil opener assembly 10' in accordance with a second embodiment of the present disclosure based on the soil opener assembly 10 of FIG. 1 including laterally spaced first and second soil opener units 100', 100" instead of a single soil opener unit 100 (features in common are labelled accordingly).

Figure 5A:
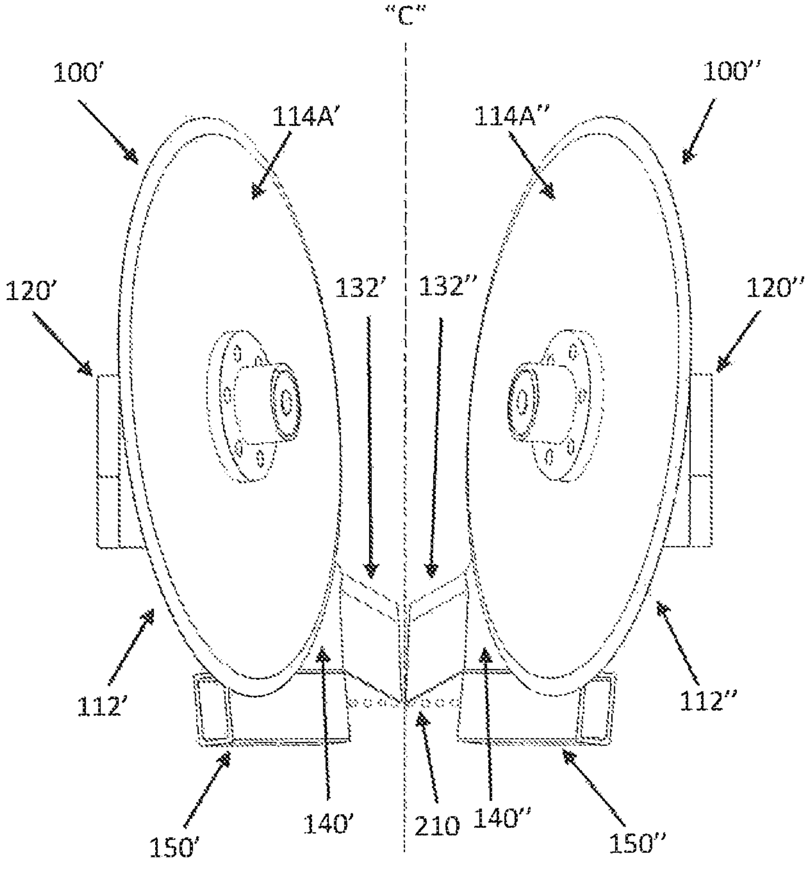
FIG. 5A is a schematic perspective top view of the pair of soil opening units of the soil opener assembly of FIG. 4 in a longitudinally aligned configuration.
Figure 5B:
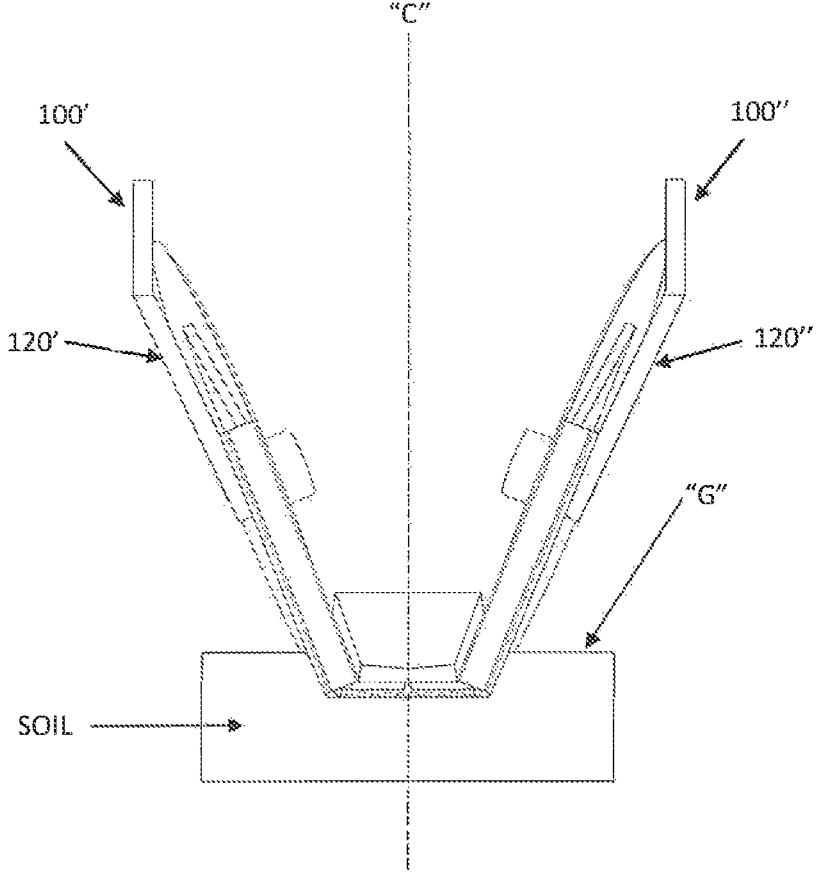
FIG. 5B is a schematic rear view of the pair of seeding soil opening units of FIG. 5A in the longitudinally aligned configuration in the ground.

As illustrated in FIGS. 5A and 5B, the first and second soil opener units are mounted via soil opener unit support frame arm 102' on opposed sides of a central axis "C" to the first-defined soil opener unit, with first soil opener unit 100' corresponding exactly to soil opener unit 100 and second soil opener unit 100" being angled to provide a mirror image of first soil opener unit 100' relative to the central axis "C" whereby the leading sides 114A', 114A" of the rotating discs 112', 112" are facing one another and laterally projecting fixed blades 132', 132" meet in close proximity at the central axis.

Figure 6A:
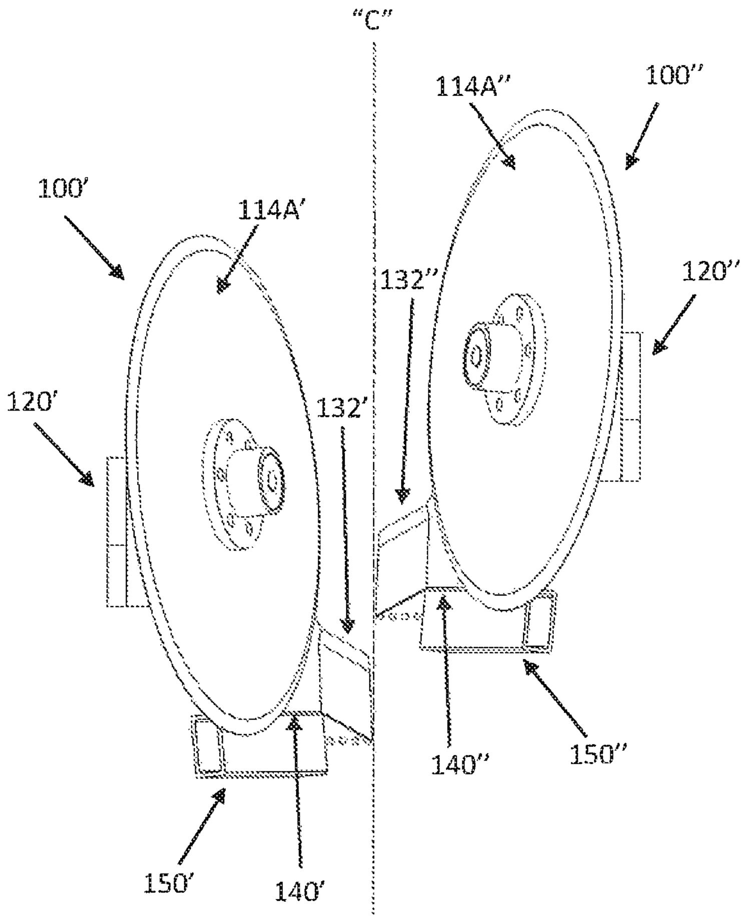
FIG. 6A is a schematic perspective top view of the pair of soil opening units of the soil opener assembly of FIG. 4 in a longitudinally offset configuration.
Figure 6B:
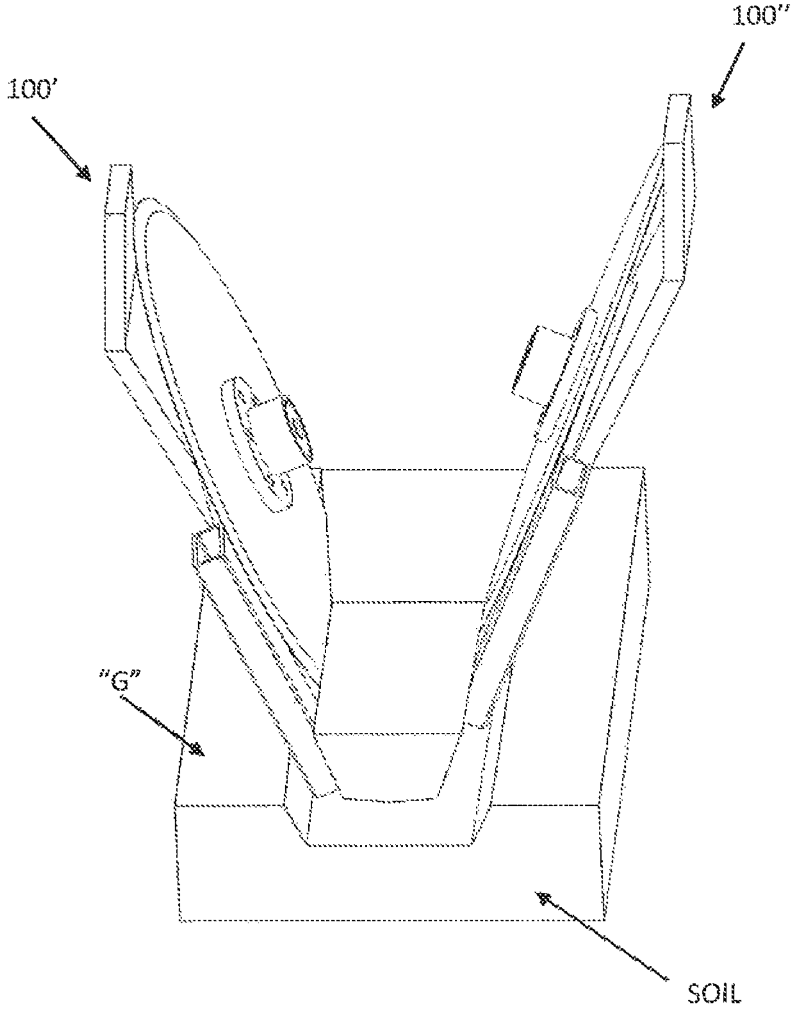
FIG. 6B is a schematic rear perspective view of the pair of seeding soil opening units of FIG. 5A longitudinally offset configuration in the ground.

In the arrangement of FIGS. 5A and 5B, the first and second soil opener units 100', 100" are longitudinally aligned. However, in another embodiment (see FIGS. 6A and 6B), the first and second soil opener units 100', 100" may be longitudinally offset such that laterally projecting fixed blades 132', 132" are longitudinally non-overlapping.

For completeness, although laterally projecting fixed blades 132', 132" are shown as discrete parts, a single blade part could replace the pair of parts, with the single blade part being supported by one or both of the lower connecting brackets 140', 140".

The invention claimed is:

1. A soil opener for driving through soil in a direction of travel, the soil opener comprising:

a support; and a soil opener unit mounted on the support, wherein the soil opener unit comprises:

first and second soil-cutting members, wherein the first soil-cutting member is a leading soil-cutting member and the second coil-cutting member is a trailing soil-cutting member, and a delivery tube with an exit aperture for releasing material to be deposited in the soil;

wherein:

the first soil-cutting member comprises a rotating disc having a first soil-engaging surface inclined (a) at a first angle to a perpendicular to a soil surface when viewed along the direction of travel, the first angle being greater than zero and (b) at a second angle to the direction of travel when viewed along a perpendicular to the soil surface, the second angle being greater than zero, whereby the rotating disc defines a leading upwardly-inclined face defining a leading side of the rotating disc and a trailing downwardly-inclined face defining a trailing side of the rotating disc relative to the direction of travel;

the second soil-cutting member comprises a fixed blade defining a second soil-engaging surface, wherein (a) the second soil-engaging surface comprises a soil lifting surface projecting laterally relative to the first soil-cutting member and (b) the fixed blade is located on the leading side of the rotating disc; and the exit aperture of the delivery tube is provided adjacent a rear part of the soil lifting surface.

2. The soil opener of claim 1, wherein the fixed blade is positioned rearwardly of an axis of rotation of the rotating disc relative to the direction of travel.

3. The soil opener of claim 1, wherein the exit aperture is angled to direct delivered material beneath the fixed blade.

4. The soil opener of claim 1, wherein the delivery tube is laterally offset relative to the fixed blade.

5. The soil opener of claim 4, wherein the delivery tube is located substantially behind an outer envelope of the rotating disc.

6. The soil opener of claim 1, wherein the fixed blade is positioned in advance of the exit aperture relative to the direction of travel.

7. The soil opener of claim 1, wherein the soil lifting surface sits outside the circumference of the first soil-engaging surface when viewed transversely to the direction of travel and parallel to the soil surface.

8. The soil opener of claim 1, wherein the exit aperture of the delivery tube sits outside the circumference of the first soil-engaging surface when viewed transversely to the direction of travel and parallel to the soil surface.

9. The soil opener of claim 1, wherein the first angle is greater than the second angle.

10. The soil opener of claim 9, wherein the first angle lies in a range of about 5 to about 30 degrees and the second angle lies in a range of about 2-15 degrees.

11. The soil opener of claim 1, wherein the first soil-engaging surface is configured to penetrate into the soil to a first depth below the soil surface and the soil lifting surface is configured to penetrate into the soil to a second depth below the soil surface, the second depth being less than the first depth.

12. The soil opener of claim 1, wherein the soil lifting surface extends at a third angle relative to the soil surface, wherein the third angle lies in a range of about 0-45 degrees.

13. The soil opener of claim 1, wherein the fixed blade defines leading and trailing fixed blade edges and the soil lifting surface comprises a substantially planar blade surface extending between the leading and trailing fixed blade edges.

14. The soil opener of claim 12, wherein one or more the leading and trailing fixed blade edge projects substantially parallel to the soil surface.

15. The soil opener of claim 13, wherein leading fixed blade edge of the fixed blade is swept back relative to the direction of travel by a fourth angle, wherein the fourth angle is in a range of about 0-30 degrees.

16. A soil opener for driving through soil in a direction of travel, the soil opener comprising:

a support; and first and second soil opener units mounted on the support on opposed sides of a central axis;

wherein the first soil opener unit comprises:

first and second soil-cutting members, wherein the first soil-cutting member is a leading soil-cutting member and the second soil-cutting member is a trailing soil-cutting member, and a first delivery tube with a first exit aperture for releasing material to be deposited in the soil;

wherein:

the first soil-cutting member comprises a first rotating disc having a first soil-engaging surface inclined in a first direction (a) at a first angle to a perpendicular to a soil surface when viewed along the direction of travel, the first angle being greater than zero and (b) at a second angle to the direction of travel when viewed along a perpendicular to the soil surface, the second angle being greater than zero, whereby the first rotating disc defines a first leading upwardly-inclined face defining a leading side of the first rotating disc and a first trailing downwardly-inclined face defining a trailing side of the first rotating disc relative to the direction of travel; and the second soil-cutting member comprises a first fixed blade defining a second soil-engaging surface;

wherein:

the second soil-engaging surface comprises a first soil lifting surface projecting laterally relative to the first soil-cutting member, and the first fixed blade is located on the leading side of the first rotating disc; and the first exit aperture of the first delivery tube is provided adjacent a rear part of the first soil lifting surface; and wherein second the soil opener unit comprises:

third and fourth soil-cutting members, wherein the third soil-cutting member is a leading soil-cutting member and the fourth soil-cutting member is a trailing soil-cutting member, and a second delivery tube with a second exit aperture for releasing material to be deposited in the soil;

wherein:

the third soil-cutting member comprises a second rotating disc having a third soil-engaging surface inclined in a second direction (a) at a first angle to a perpendicular to the soil surface when viewed along the direction of travel, the first angle being greater than zero and (b) at a second angle to the direction of travel when viewed along a perpendicular to the soil surface, the second angle being greater than zero, whereby the second rotating disc defines a second leading upwardly-inclined face defining a leading side of the second rotating disc and a second trailing downwardly-inclined face defining a trailing side of the second rotating disc relative to the direction of travel; and the fourth soil-cutting member comprises a second fixed blade defining a fourth soil-engaging surface;

wherein:

the fourth soil-engaging surface comprises a second soil lifting surface projecting laterally relative to the third soil-cutting member, and the second fixed blade is located on the leading side of the second rotating disc; and the second exit aperture of the second delivery tube is provided adjacent a rear part of the second soil lifting surface.

* * * * *